United States Patent [19]

Blyth

[11] 4,257,083

[45] Mar. 17, 1981

[54] PROCESS FOR PRESERVING PASTEL WORKS OF ART

[76] Inventor: Victoria S. Blyth, 1158 Palms Blvd., Venice, Calif. 90291

[21] Appl. No.: 86,700

[22] Filed: Oct. 22, 1978

Related U.S. Application Data

[63] Continuation of Ser. No. 954,347, Oct. 25, 1978, abandoned.

[51] Int. Cl.³ .............................................. H01N 13/00
[52] U.S. Cl. ...................................... 361/234; 40/152
[58] Field of Search ................... 361/233, 234; 40/152

[56] References Cited

U.S. PATENT DOCUMENTS

| | | | |
|---|---|---|---|
| 3,634,740 | 1/1972 | Stevko | 361/234 |
| 3,916,270 | 10/1975 | Wachtler | 361/234 |

Primary Examiner—J. D. Miller
Assistant Examiner—L. C. Schroeder
Attorney, Agent, or Firm—Keith D. Beecher

[57] ABSTRACT

A process for preserving pastel works of art which comprises providing a flexible or rigid panel, attaching a multiplicity of conductors to the panel, interconnecting the conductors to form two groups insulated from one another, placing the pastel work to be preserved on the panel, and applying an electric potential across the two groups of conductors to establish an electrostatic field at the surface of the panel to attract the pastel particles (which have high dielectric properties) into the plane of the panel and to hold the pastel particles firmly in fixed positions on the surface of the paper or other medium which forms the substrate for the work of art.

2 Claims, 6 Drawing Figures

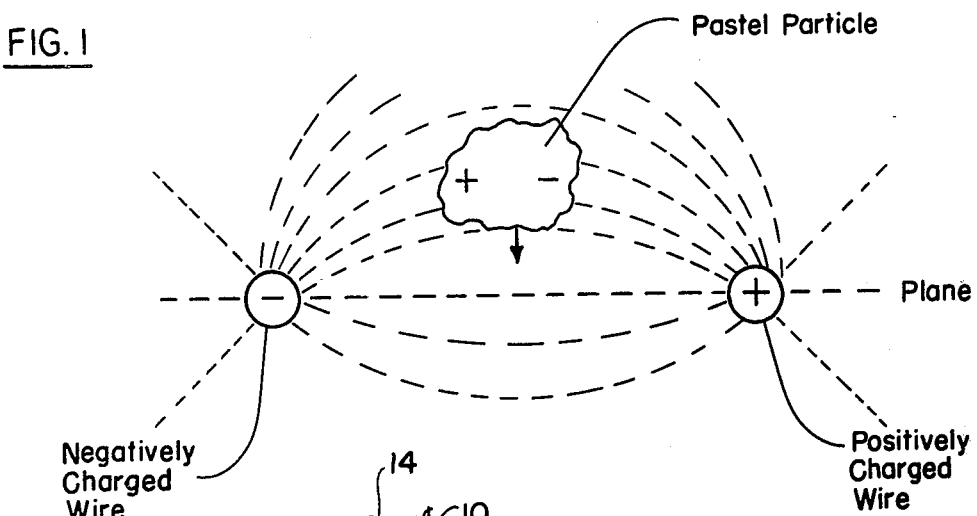
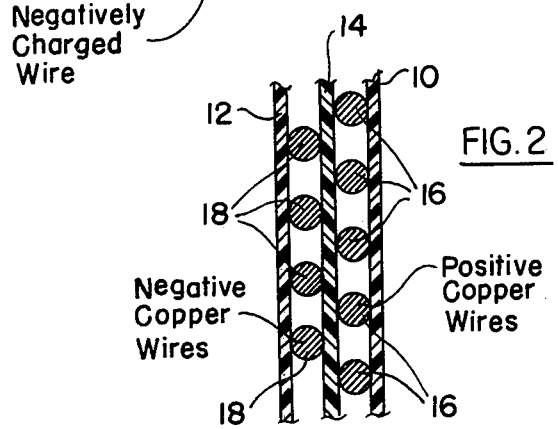
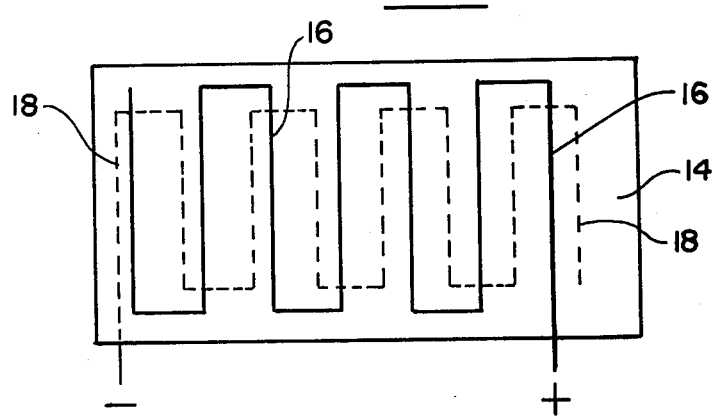
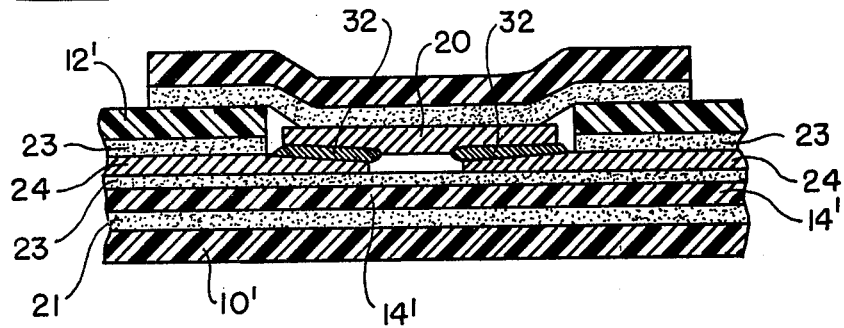

PROCESS FOR PRESERVING PASTEL WORKS OF ART

This application is a continuation of copending application Ser. No. 954,347 filed Oct. 25, 1978, now abandoned.

BACKGROUND

Artists of the 19th Century such as Cassatt, Degas, Morisot and Renoir, to name only a few, worked with pastels. Increasingly pastels of this period are in need of treatment, to a point where they represent one of the major problems in art conservation today. Works of art in pastel are inherently unstable. This is because the pastel medium consists of dry pigment particles held together with a binder. The sole purpose of the binder, most commonly gum tragacanth, is to hold the pigment particles together in order to form a stick which is used to apply the pastel pigments to the paper or other substrate which forms a vehicle for the work of art. The adhesion of the pastel pigment particles to the substrate, which usually is paper, depends largely on the degree of pressure exerted by the artist on the stick during the execution of the work, and surface texture of the paper or substrate. Inherently, the pastel is extremely fragile and the pastel particles have a natural tendency to flake off from the paper substrate. Once the pastel particles have been applied to the substrate, virtually any condition which affects the weak adhesive forces holding the particles to the substrate causes damage to the piece and a subsequent loss of pigment. For example, vibration of a pastel work during travel or extensive handling, hygroscopic activity of the paper or substrate, and even the electrostatic charges which are present if the work is improperly framed with acrylic rather than glass, all will contribute towards the deterioration of the pastel.

The use of fixatives is not satisfactory in the case of pastels for a variety of reasons. One of the reasons is the irreversibility of fixatives with respect to pastels, since the fixatives cannot be removed without total destruction of the work. Another reason militating against the use of usual fixatives is the undesirable changes in overall color balance and color relationships which occur when known fixatives are applied to a pastel work. Still other reasons include the undesirable alteration of the surface of a pastel by known fixatives, aging characteristics of known fixatives requiring their removal in time which, as stated, would destroy the pastel, and adverse effects on the pastel due to the pH of known fixatives. It is well known in the arts, and to art conservators, that the fixing of pastels, or other friable materials, such as charcoal or graphite, is a completely irreversible process with many complications. In fact, manufacturers of pastels in many instances specifically do not recommend the use of fixatives.

In accordance with the concepts of the process of the present invention, by creating an electrostatic attraction between the pastel particles and the paper or other substrate of the work, the existing pastel works of art may be stabilized in their original condition on the substrate without exposing the works to any irreversible fixative processes.

BRIEF DESCRIPTION OF THE DRAWINGS

FIG. 1 is a schematic representation of the electrostatic field created between a negative charged wire and a positively charged wire, and the effect of such a field on a pastel pigment particle, which has a high dielectric constant;

FIG. 2 is a fragmentary cross-sectional view of a prototype version of an electrostatic stabilizing assembly used in the process of the invention in one embodiment;

FIG. 3 is a simplified front view of the prototype version of the electrostatic stabilizing assembly of FIG. 2

FIG. 6 is a detailed section of the assembly of FIG. 4, on an enlarged scale, taken along the lines 6—6 of FIG. 4.

DETAILED DESCRIPTION OF THE PREFERRED EMBODIMENT OF THE PROCESS

Figure 4:
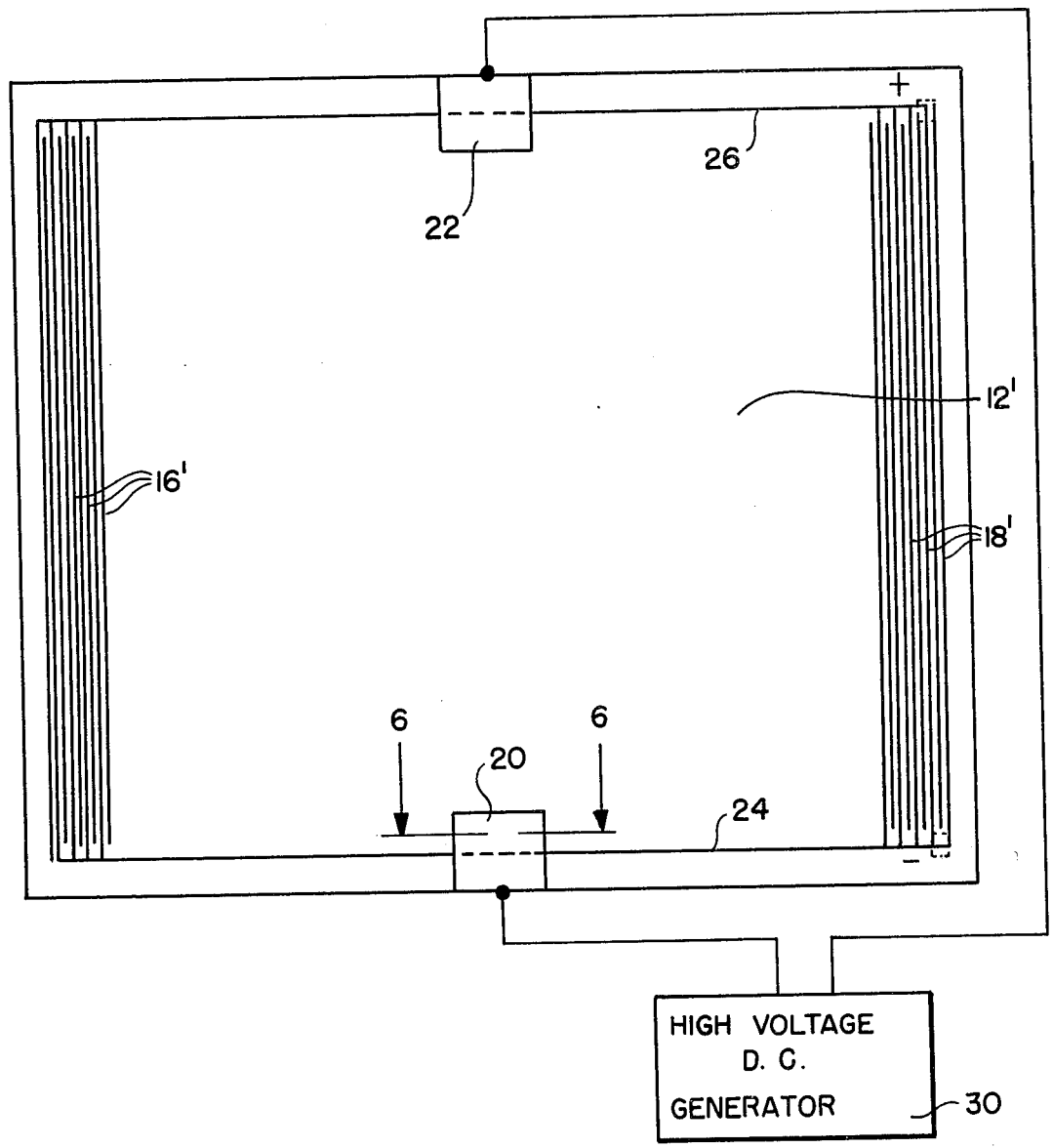
FIG. 4 is a simplified front view of a presently preferred version of the electrostatic stabilizing assembly.

It is well known that an object which has an electric charge will attract an object which has an opposite electric charge, commonly referred to as positive or negative charges. When there are two point charges, each with an opposite polarity, an electrostatic field is subjected to a pull from both charge points, especially when this object has a high dielectric constant, such as pastel particles. A pastel particle is illustrated in FIG. 1, and, as shown by the arrow, this particle is attracted in the direction of the plane between the two points of opposite charges.

An electrostatic stabilizing assembly implements the electrostatic field of FIG. 1. The assembly may, for example, be flexible in nature, and it may be formed of three flexible transparent sheets of appropriate plastic material such as Mylar, these sheets being designated as 10, 12 and 14 in FIG. 2. A first group of electric wires 16 is attached to one side of sheet 14, and a second group of electric wires 18 is attached to the other side of sheet 14. The wires 16 are interconnected in the manner shown in FIG. 3, and the wires 18 are also interconnected in the manner shown in FIG. 3. The sheets 10, 12 and 14 are pressed together to form a laminated sandwich, as best shown in FIG. 2, with the sheet 10 covering the wires 16, and with the sheet 12 covering the wires 18. It will be observed from FIG. 3, that the wires 16 are interspersed with the wires 18 across the surface of the laminated sandwich.

The groups of wires 16 and 18 are connected to a high voltage direct current generator, so that a direct current voltage may be introduced across the wires, as designated by the symbols "+" and "−" in FIG. 3. When the generator is activated, an electrostatic field is created at the surface of the laminated sandwich assembly of FIGS. 2 and 3.

Then, when a substrate 50, such as a sheet of paper, or other high dielectric material bearing a pastel work of art, is placed on the surface of the sheet 10 (FIG. 2), the substrate is attracted to and held against the surface of sheet 10 in a non-slipping relationship, and the pastel particles 1 on the substrate 50 are firmly retained and fixed by the action of the electrostatic field.

Figure 5:
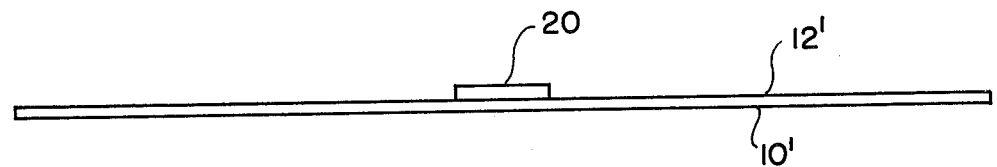
FIG. 5 is an end view of the assembly of FIG. 4.

The field producing portion of the stabilizing assembly shown in FIGS. 4, 5 and 6 takes the form of a printed circuit comprising, for example, narrow strips of copper foil laminated in insulating films. The insulating films may be any appropriate plastic film such as Mylar, as described above, or a polyimide film such as presently marketed by the duPont Company under the trademark "Kapton", may be used. The resulting laminates are also sold by the duPont Company under the trademark "Pyralus". Moreover, a plastic material used in microphones which holds an electrostatic charge and which is known as "Electret", may be used.

For example, in a constructed embodiment, a Mylar sheet of 0.003 inch thickness is covered with a spray adhesive such as marketed by the 3M Company, and designated their "77 Spray Adhesive". The Mylar sheet 14' (FIG. 6) is coated on both sides with coatings 21 and 23 of adhesive. Copper wires 16' and 18' are placed on both sides of the sheet 14' in spaced and parallel relationship with one another, as best shown in FIG. 4. The leads are held in position by the adhesive layers 21 and 23. The leads 16' are connected together by a buss bar 26 (FIG. 4), and the leads 18' are connected together by a buss bar 24. The buss bar 26 is connected to an electrode 22, and lead 24 is connected to an electrode 20. These electrodes are connected across a high voltage direct current generator 30, so that when the generator is energized, a high voltage is applied between the leads 16' and 18', so as to create the desired electrostatic field at the surface of the assembly.

The leads on one side of the center sheet 14' are covered by a 0.001 inch Mylar sheet 10', which is attached to the assembly by the adhesive layer 21. The leads on the other side of the central Mylar sheet 14 are covered by a 0.001 Mylar sheet 12', which is attached to the assembly by the adhesive layer 23.

As shown in FIG. 3, the electrodes, such as electrode 20 are soldered to the buss bars, such as the buss bar 24, by a soldering joint 32. During construction, the entire assembly is pressed with a rubber roller to force out air trapped in the sandwich. For optimum efficiency, a low humidity environment is preferred during construction.

The electrostatic stabilizing assembly serves as an auxiliary support for the pastel work of art. In practicing the process of the invention, the pastel work, with is paper substrate, are first placed in a horizontal position on the surface of the electrostatic field-producing portion of the stabilizing assembly for, for example, about one hour. This operation insures a constant and equal charge throughout the paper and the pastel particles. The plate and the work are then raised to a vertical position, and the assembly is now ready for installation in a frame. The entire assembly is then framed using recommended methods of pastel framing, including a glass 52 (FIG. 2) and a dustproof frame 54 (FIG. 2), as in an "environmental chamber" with controlled temperature and humidity, completely sealed and stabilized environment. It is important that the frame be dustproof to prevent foreign particles from being attracted to the surface of the pastel, and to be held in the electrostatic field.

The high voltage generator 30 (FIG. 4) may be of the type which transforms a direct current voltage of, for example, 10 volts into an output direct current voltage of the order of 10 kilo-volts. The generator 30 may be powered by nickel cadmium batteries which are constantly maintained in a charged state by a recharger which is plugged into the usual alternating current main. If the alternating current power should fail, the batteries will take over as an emergency measure. In addition, battery operation will maintain the properly charged condition of the assembly during travel.

It has been found that with controlled temperature and humidity, the generator 30 activating the electrostatic stabilizing plate may be turned off for a period up to five weeks, and the plate will still have the capability of retaining the paper substrate and pastel particles in place in a vertical position.

The process of the invention, as described above, is most advantageous in the stabilization of pastels since it does not in any way alter the original characteristics of the work. The electrostatic stabilizing assembly may be incorporated as an auxiliary support directly within the frame of the work of art, as described above, or it may be incorporated into a separate easel-like support unit, or embedded in a wall, or it may take a variety of forms. As explained, the electrostatic stabilizing assembly may be rigid or flexible. The electrostatic stabilizing assembly has an advantage in that it may be battery operated, so as to protect the work during shipment, or during power failures.

Therefore, while a particular embodiment of the invention has been shown and described, modifications may be made. It is intended in the claims to cover such modifications which come within the spirit and scope of the invention.

What is claimed is:

1. A process for preserving pastel works of art which comprises the following steps: providing a panel having a multiplicity of conductors attached thereto interconnected to form two groups insulated from one another; placing the pastel work to be preserved on the panel; and applying and maintaining an electric potential across the two groups of conductors to establish an electrostatic field at the surface of the panel to attract the pastel particles of the work of art into the plane of the panel and to hold the pastel particles firmly in fixed positions on the surface of the paper or other medium which forms the substrate for the work of art.

2. The process defined in claim 1, and which includes the step of providing a transparent member across the pastel particles on the substrate, and by providing a frame mounting the transparent member to the panel to extend around the work of art and form a dustproof sealed chamber therefor.

* * * * *